A. A. TIRRILL.
MAINTAINING A CONSTANT POWER FACTOR IN A SYSTEM OF DISTRIBUTION.
APPLICATION FILED AUG. 20, 1908.
1,084,674. Patented Jan. 20, 1914.
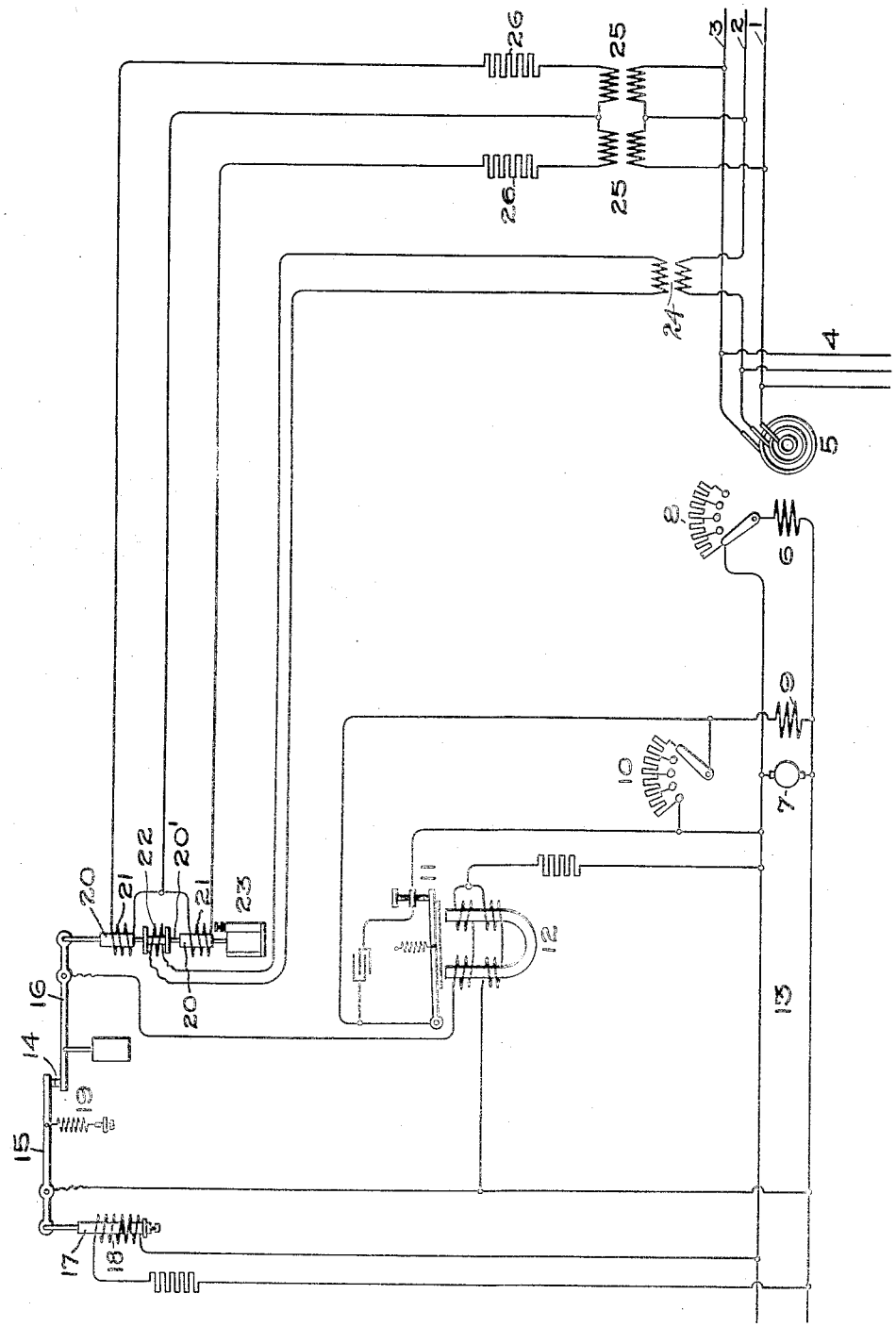

UNITED STATES PATENT OFFICE.

ALLEN A. TIRRILL, OF SCHENECTADY, NEW YORK, ASSIGNOR TO GENERAL ELECTRIC COMPANY, A CORPORATION OF NEW YORK.

MAINTAINING A CONSTANT POWER FACTOR IN A SYSTEM OF DISTRIBUTION.

1,084,674.  Specification of Letters Patent.  Patented Jan. 20, 1914.

Application filed August 20, 1908. Serial No. 449,402.

*To all whom it may concern:*

Be it known that I, ALLEN A. TIRRILL, a citizen of the United States, residing at Schenectady, county of Schenectady, State of New York, have invented certain new and useful Improvements in Maintaining a Constant Power Factor in a System of Distribution, of which the following is a specification.

This invention relates to alternating current systems of distribution in which the phase relation between the current and potential is regulated by a synchronous motor or the like. The invention has especial reference to means for automatically regulating the field magnetization of such synchronous machine. It is well known that by varying the field excitation of a synchronous motor connected to an alternating current distributing system the power factor of the system can be maintained constant.

The object of my invention is to provide an improved means for automatically regulating the field excitation of the synchronous machine in response to a change in the power factor of the circuit, for the purpose of maintaining the power factor constant.

In carrying out my invention I employ a modified Tirrill regulator for controlling the excitation of the field of the synchronous machine, which preferably floats on the system. The regulator is of the standard type except that in place of the usual alternating current control magnet, I use a solenoid having two potential windings, respectively supplied with current from two potential transformers across two sides of the line, and a floating current coil mounted on the core of the solenoid and supplied with current from a current transformer on the line conductor located between the two transformers. To prevent too rapid movements of the movable coil, a dash-pot is connected to the core. The effect of this arrangement is to hasten or retard the time of the closing of the main control contacts in accordance with the fluctuations in phase between the current and potential so as to increase or decrease the field excitation of the synchronous motor and thereby throw into the system either a leading or a lagging current as may be required.

The accompanying drawing is a diagram illustrating an alternating current system of distribution embodying my invention.

The supply mains 1, 2, 3 of a three phase line furnish current to a load circuit 4 and also to a synchronous motor 5 whose field coil 6 is energized by an exciter 7. A rheostat 8 in series with the field coil 6 enables the magnetization of the synchronous motor field to be adjusted. The circuit of the exciter field coil 9 also contains an adjustable resistor 10 which is shunted by the contacts 11, controlled by the differentially wound relay 12, taking current from the exciter busses 13. The relay is controlled by a pair of floating contacts 14 carried on levers 15, 16, the former being attached to the movable core 17 of a direct current control magnet 18 which is connected across the mains of the exciter. The pull of the magnet is opposed by a spring 19. The other lever 16 is attached to cores 20 which are attached to a stem 20' and move freely up and down through fixed coils 21. The stem 20' carries a floating coil 22. A dash-pot 23 is connected with said core to retard its movements. The coil 22 is in circuit with a current transformer 24 on one of the line conductors. Potential transformers 25 are connected across the line, each being in series with one of the coils 21. Non-inductive resistors 26 reduce the current in the coils 21.

The operation is as follows: Suppose that the synchronous motor is running without load, and the floating control contacts and other parts are adjusted so that the synchronous motor is excited to such a value as to give neither leading or lagging currents; in other words, let the power factor of the system be unity. Under these conditions, the current and potential being in phase with each other and 120 electrical degrees apart in the respective mains, the resultant force exerted by the upper potential coil 21 upon the current coil 22 is equal and opposite to the resultant force exerted by the lower potential coil 21 upon the current coil 22. This will be true irrespective of the amount of current flowing in the current coil, providing the power factor of the system remains constant, which in the present instance has been assumed to be unity. But if the power factor tends to vary from unity, the current in coil 22 tends to shift more nearly into phase with the current in one of the potential windings while the phase difference between the current of winding 22 and the other potential coil 21 becomes greater. This unbalances the resultant forces and causes the coil 22 to move upward or downward according to which way the power factor tends to vary from unity. For example, if the current tends to lag behind the electromotive force the coil moves down, thereby raising the contact 14 on the lever 16 and causing it to close sooner and remain closed longer in the rapid opening and closing action of the Tirrill regulator. This causes an overexcitation of the field winding 6 of the synchronous motor, which takes a leading current to counteract the lag in the system and restores the power factor to unity, providing the motor is of sufficient capacity and the inherent regulation is sufficiently close. For a leading current on the system, a reverse action will take place.

What I claim as new and desire to secure by Letters Patent of the United States, is,—

1. In a polyphase system of distribution having a synchronous dynamo electric machine connected thereto for controlling the power factor of the system, means for controlling the excitation of said synchronous dynamo electric machine including the combination of a resistance, a shunt circuit around said resistance, a pair of floating contacts controlling said shunt circuit, means responsive to the potential impressed on the field of said synchronous machine for controlling one of said floating contacts, and means responsive to the power factor of the system for controlling the other of said floating contacts, said last named means comprising relatively movable coils responsive respectively to the potential across a plurality of the sides of said system of distribution and to the current flowing in said system.

2. In a three-phase system of distribution having a synchronous dynamo electric machine connected thereto for controlling the power factor of the system, means for controlling the excitation of said synchronous dynamo electric machine including the combination of a resistance, a shunt circuit around said resistance, a pair of floating contacts controlling said shunt circuit, means responsive to the potential impressed on the field of the synchronous machine for controlling one of the said floating contacts, and means responsive to the power factor of the system for controlling the other of said floating contacts, said last named means comprising a pair of spaced fixed potential coils connected across two sides of the system, a movable current coil located between said potential coils and connected to receive current from the line conductor located between the two potential coils and means connecting said current coil to said last named floating contact.

In witness whereof, I have hereunto set my hand this 18th day of August, 1908.

ALLEN A. TIRRILL

Witnesses:
  BENJAMIN B. HULL,
  HELEN ORFORD.